United States Patent
O'Rourke

(10) Patent No.: US 6,559,848 B2
(45) Date of Patent: May 6, 2003

(54) CODING AND DECODING THREE-DIMENSIONAL DATA

(75) Inventor: Thomas P. O'Rourke, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 180 days.

(21) Appl. No.: 09/736,716

(22) Filed: Dec. 13, 2000

(65) Prior Publication Data

US 2002/0070939 A1 Jun. 13, 2002

(51) Int. Cl.[7] .............................. G06T 15/70
(52) U.S. Cl. .................. 345/473; 345/474; 345/475
(58) Field of Search ................... 345/475, 420, 345/473, 474; 375/240.02, 240.03, 240.04, 240.05, 240.06, 240.07

(56) References Cited

U.S. PATENT DOCUMENTS

| 4,600,919 A | * | 7/1986 | Stern ........................... 345/473 |
| 6,057,859 A | * | 5/2000 | Handelman et al. ......... 345/474 |
| 6,337,880 B1 | * | 1/2002 | Cornog et al. ......... 375/240.01 |
| 6,388,670 B2 | * | 5/2002 | Naka et al. .................. 345/474 |

OTHER PUBLICATIONS

Guenter et al., Motion Comprensated of Computer Animation Frames, 1993, pp. 1–8.*

* cited by examiner

Primary Examiner—Mark Zimmerman
Assistant Examiner—Linzy McCartney
(74) Attorney, Agent, or Firm—Fish & Richardson P.C.

(57) ABSTRACT

Three-dimensional data that defines a bone in a three-dimensional model is coded by coding a quaternion defining an orientation of the bone, coding vectors defining a displacement of the bone and a scaling factor for the bone, and coding a value defining a time corresponding to the orientation, displacement and scaling of the bone.

9 Claims, 10 Drawing Sheets

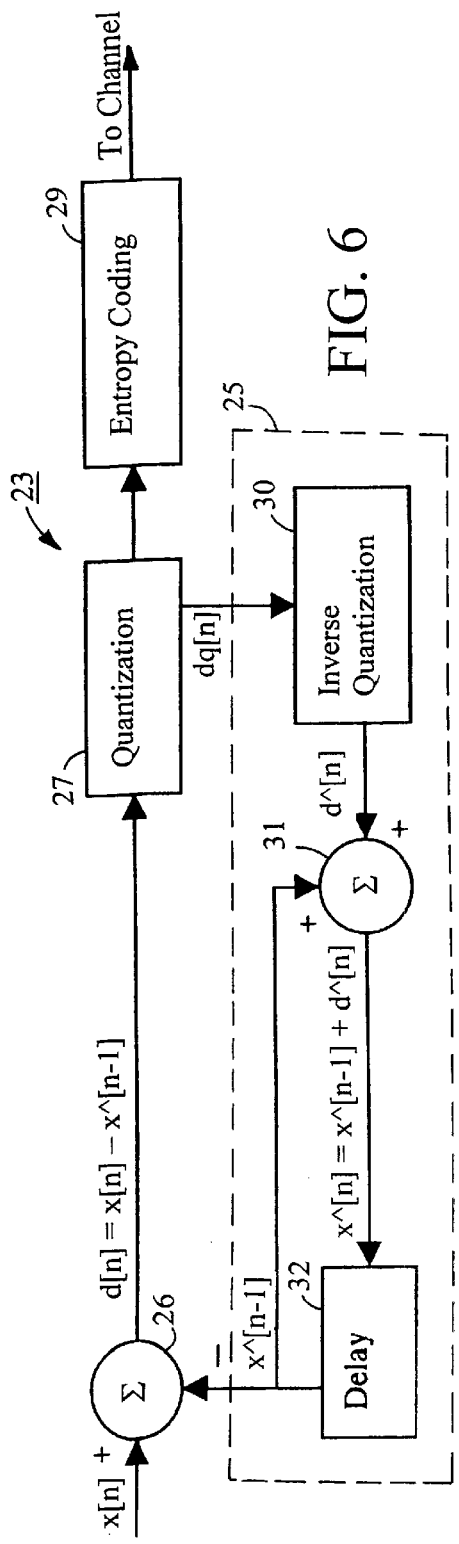
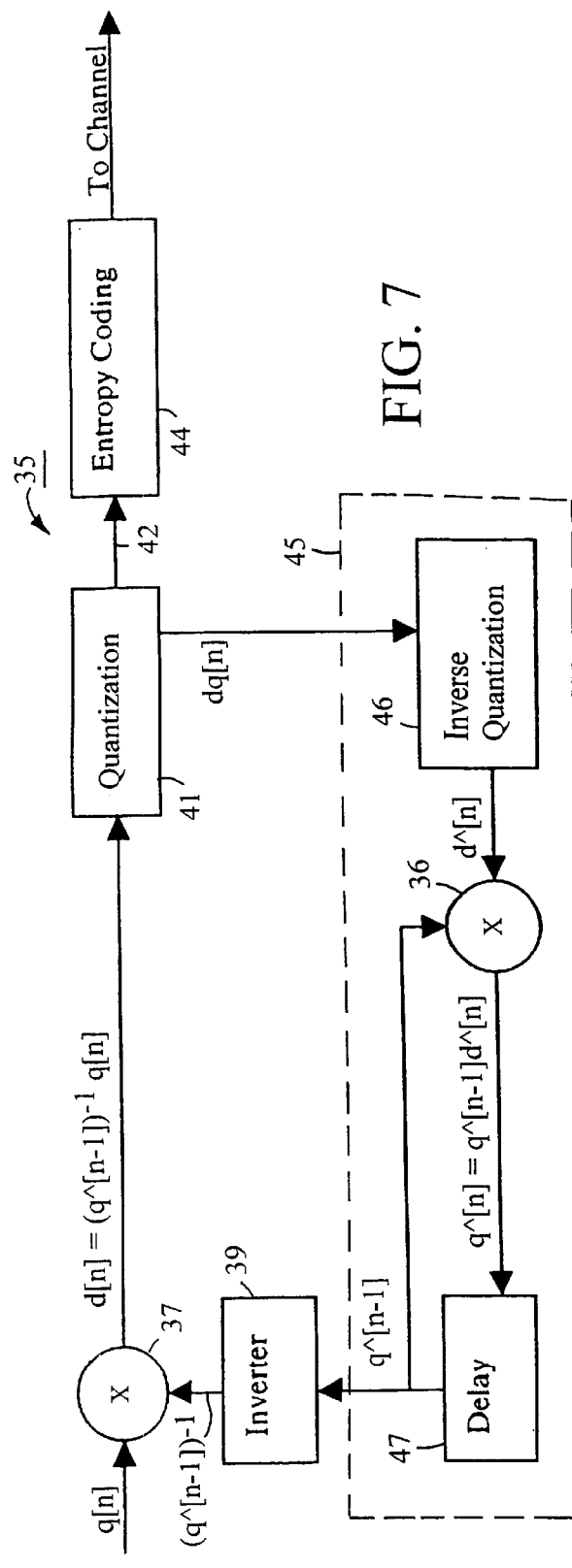

CODING AND DECODING THREE-DIMENSIONAL DATA

TECHNICAL FIELD

This invention relates to coding and decoding three-dimensional (3D) data, such as quaternions.

BACKGROUND

A 3D model includes a virtual skeleton, comprised of bones arranged in a hierarchical tree structure. Surrounding the bones are polygons, such as triangles, which represent the skin of the 3D model. Movement of the polygons is tied to the movement of the bones so that the 3D model approximates real-life movement during animation. To achieve this type of realism, a large amount of data is required to define the animation of the 3D model. Transporting such data over limited-bandwidth media, such as computer networks, can be problematic. Coding techniques have therefore been developed for reducing the amount of 3D data to be transported.

DESCRIPTION OF THE DRAWINGS

FIG. 6 is a block diagram of a DPCM (Differential Pulse Code Modulation) feedback system for coding data that relates to the bones in the 3D model.

FIG. 7 is a block diagram of a modified DPCM system for coding quaternions that relate to the bones in the 3D model.

DESCRIPTION

Figure 1:
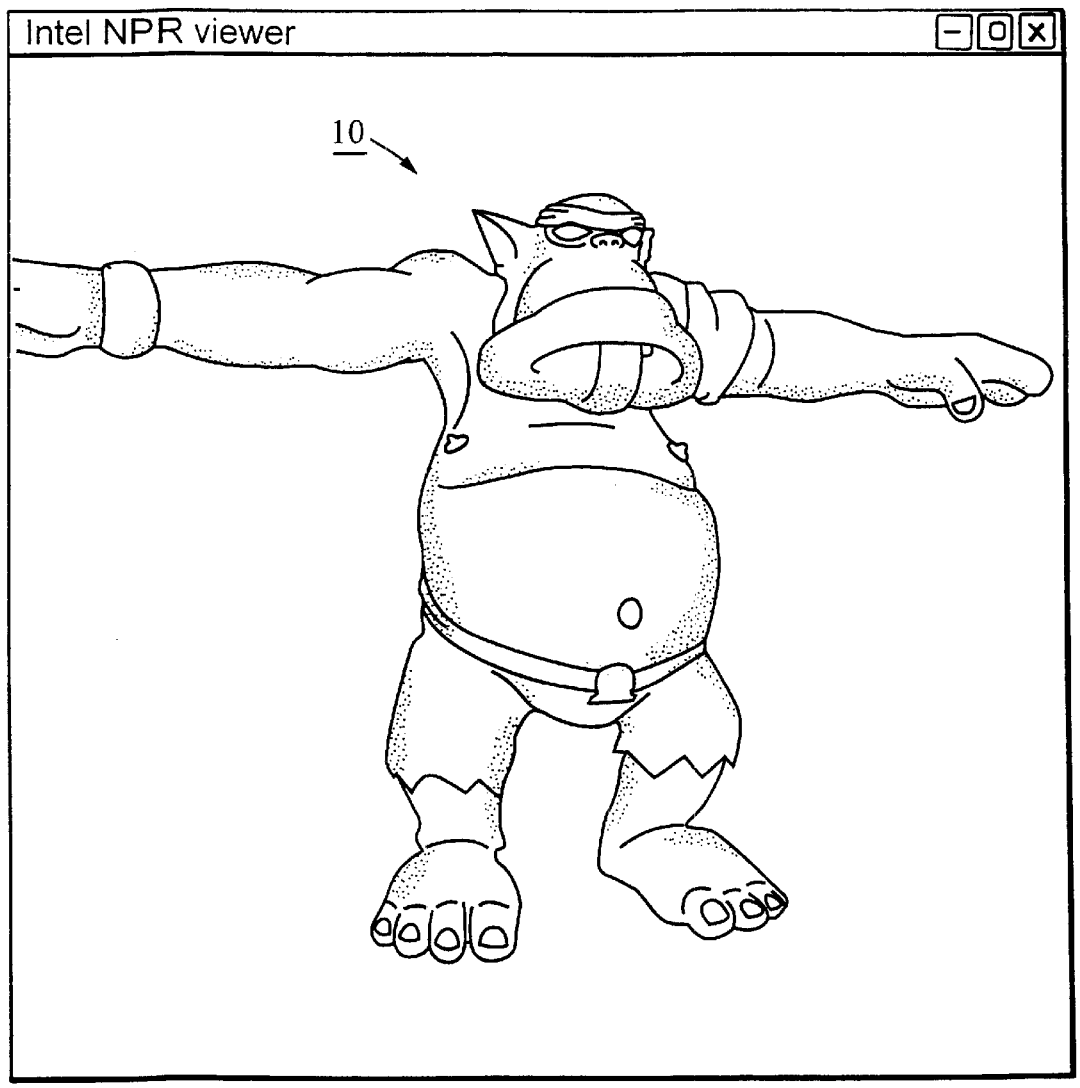
FIG. 1 is a perspective view of a 3D model.
Figure 2:
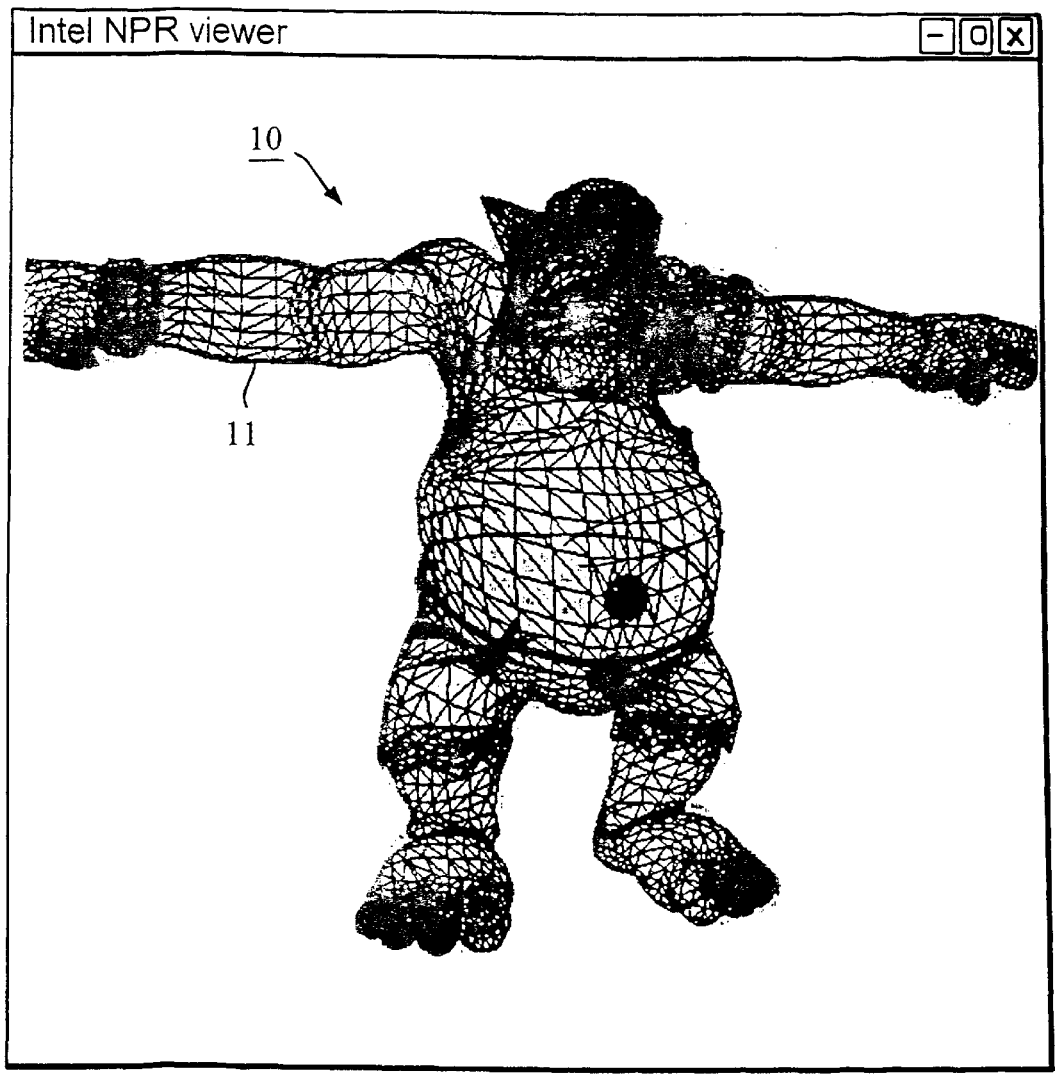
FIG. 2 is a perspective view of polygons in the 3D model.

FIG. 1 shows a 3D model 10, which is rendered from 3D data. As shown in FIG. 2, 3D model 10 is comprised of interconnecting polygons 11. Polygons 11 are triangles in this embodiment; however, other types of polygons may be used. Polygons 11 define the "skin" surface of 3D model 10.

Figure 3:
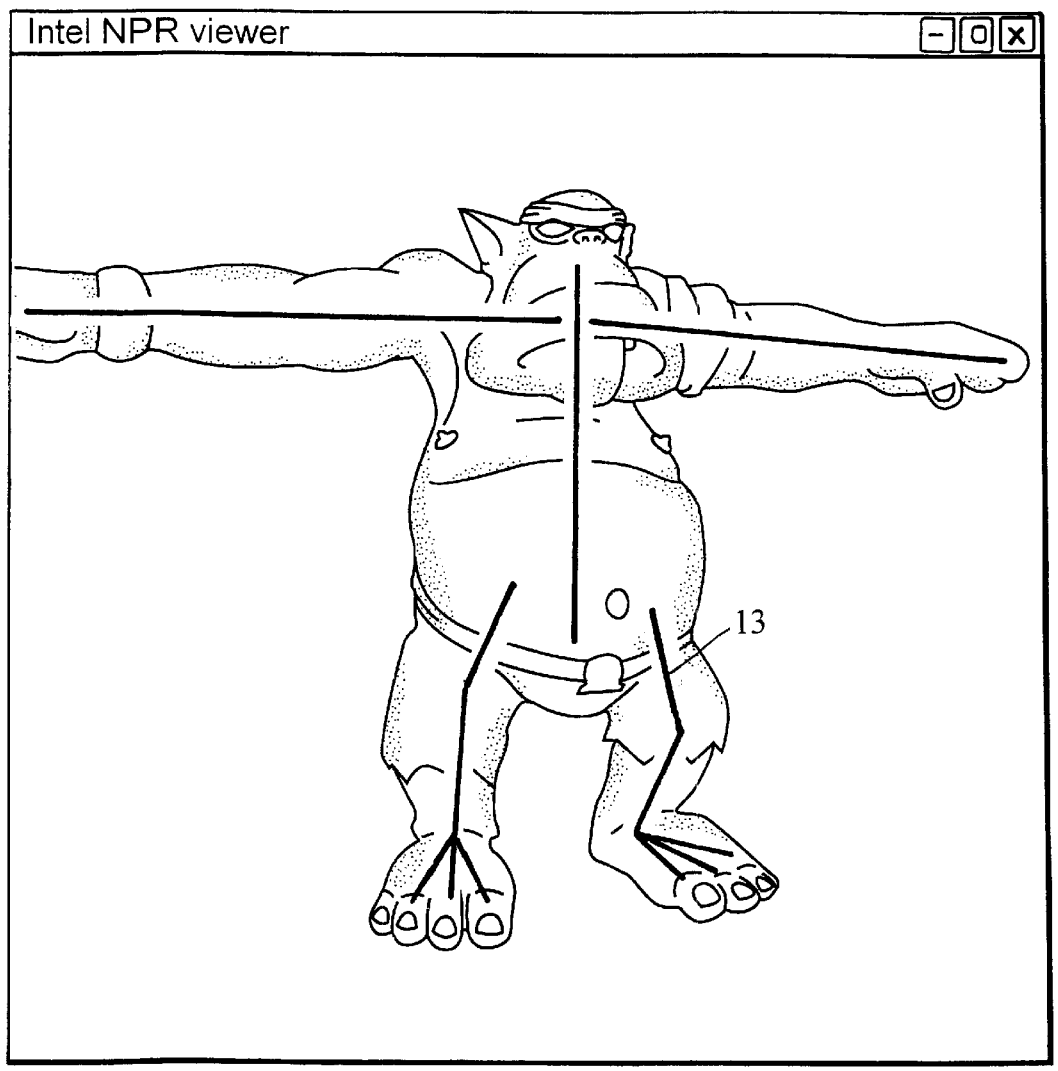
FIG. 3 is a perspective view of bones in the 3D model.

The 3D data for model 10 also includes bone data. The bone data defines a rigid skeletal structure 13 of model 10 (FIG. 3), which corresponds to the bones of a living being. The "bones" of model 10 are XYZ-space vectors in the 3D data.

The bones of model 10 are linked together in a tree-like hierarchical structure, with "child" bones branching off from "parent" bones. Each vertex of polygon 11 is associated with one or more bones. This association is defined in the 3D data that makes up 3D model 10. A polygon deforms around a bone that the polygon is associated with, much the same way that skin surrounding living bone deforms in response to an applied force. The bones may change location in response to such force, but do not change shape.

The animation of a 3D model is comprised of a sequence of key frames. Each key frame contains information about a bone at a particular instant in time. This information includes the displacement of the start of the bone from the end of its parent bone, the orientation of the bone relative to the orientation of its parent bone, one or more scaling factors that define the scale of the bone in 3D space, and the time of the displacement, orientation and scaling. Displacement and scale are represented as 3D vectors (e.g., Cartesian XYZ-space vectors). Orientation is represented as a unit-magnitude quaternion.

A quaternion is a scalar number which has the form $$q = w + xi + yj + zk, \qquad (1)$$

where i, j and k are imaginary numbers such that $$ii = jj = kk = -1 \text{ and } ij = k, \qquad (2)$$

and where w, x, y and z are real numbers. A unit-magnitude quaternion is a quaternion in which $$ww + xx + yy + zz = 1. \qquad (3)$$

One property of a unit-magnitude quaternion, q, is that, when it is multiplied by its multiplicative inverse, $q^{-1}$, the product is one. The multiplicative inverse of a unit-magnitude quaternion, q, can be calculated relatively easily by switching the signs of the non-real components of the quaternion, namely xi, yj and zk of equation (1).

Figure 4:
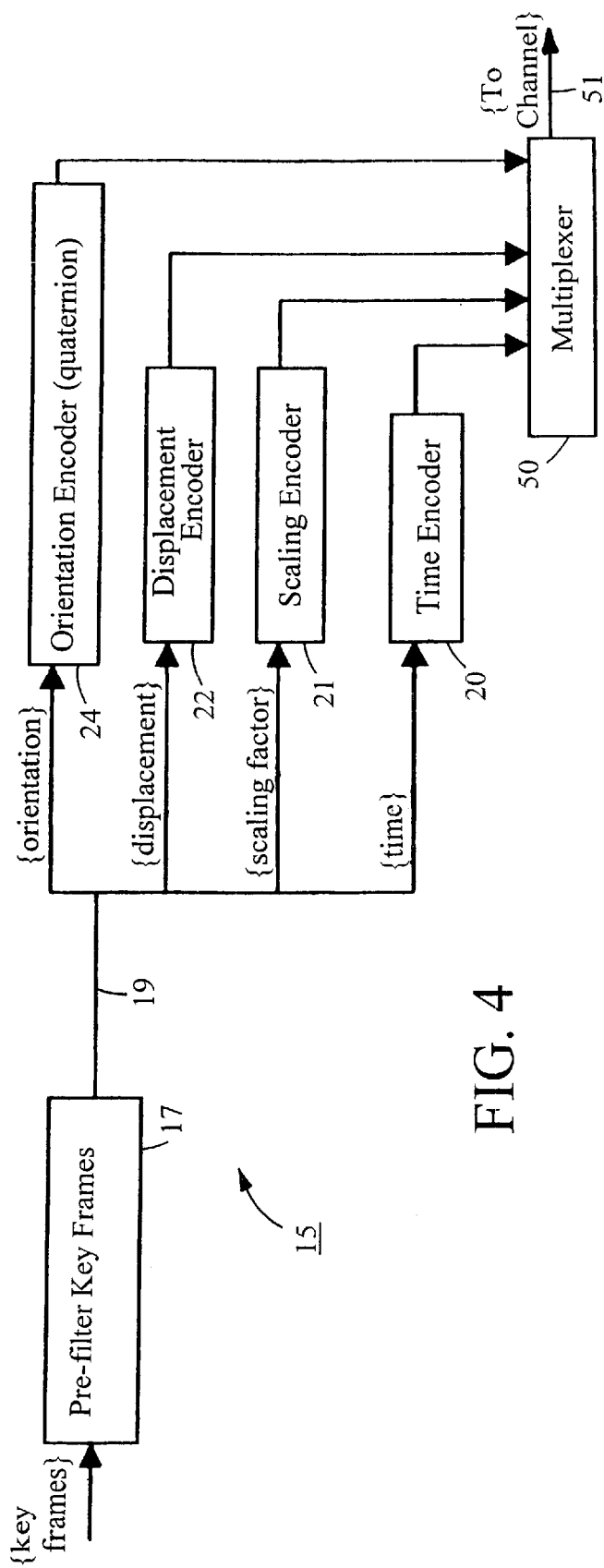
FIG. 4 is block diagram of a system for coding 3D data relating to the bones in the 3D model.
Figure 5:
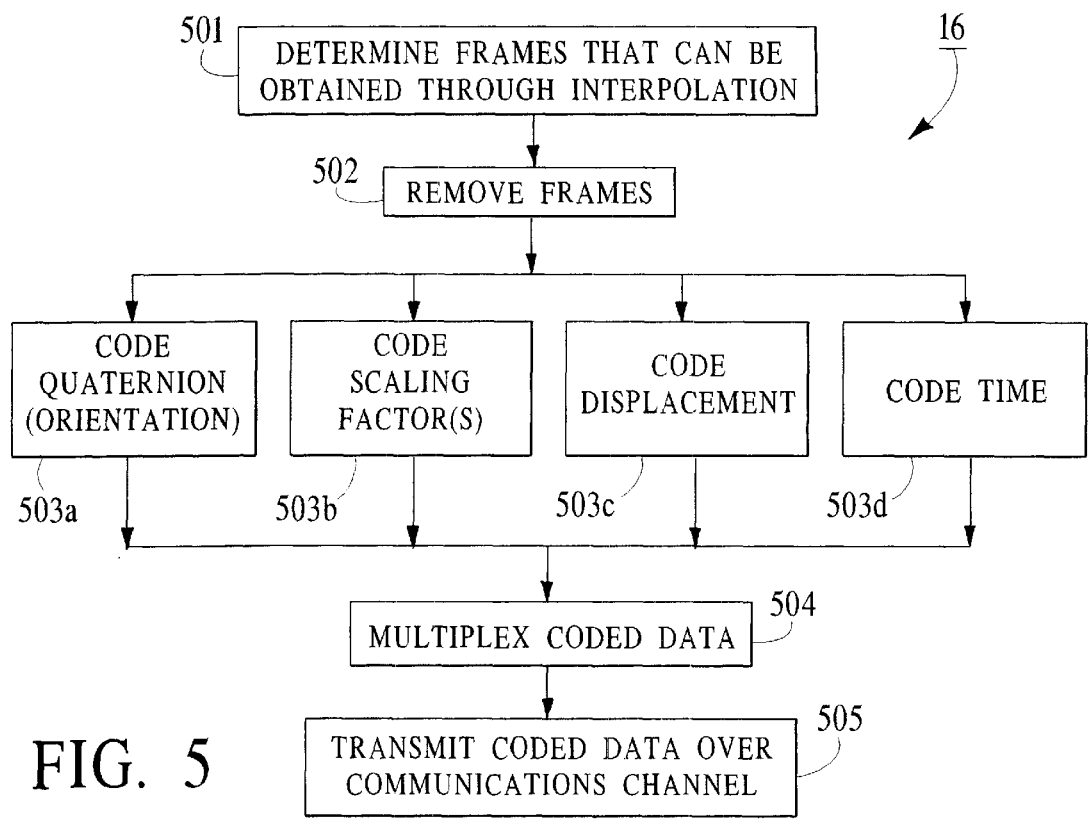
FIG. 5 is a flowchart showing a process that is performed by the system of FIG. 4.

Referring to FIG. 4, block diagram 15 depicts a portion of a transmitter for coding 3D animation data of 3D model 10 prior to transmission over a communications channel, such as a network medium. The coding process 16 implemented by block diagram 15 is described with respect to FIG. 5.

In process 16, block 17 receives key frames of 3D animation and determines (501) which of those frames can be obtained through interpolation. For example, those frames that are duplicates or relatively close in content to preceding and succeeding frames can be removed. Block 17 removes (502) the appropriate frames. Removing such frames decreases the amount of data that must be transmitted.

The resulting filtered data 19 is transmitted to coding blocks 20, 21, 22 and 24. Each of these coding blocks codes different information from a frame of 3D data. Block 20 codes (503d) time, block 21 codes (503b) scaling, block 22 codes (503c) displacement, and block 24 codes (503a) orientation. The coding is shown in parallel in FIG. 5 (as in. FIG. 4) to indicate that process 16 may perform the coding operations in parallel. Alternatively, they may be performed sequentially or partially in sequence and partially in parallel.

Blocks 20, 21 and 22 use DPCM coding. Block 24 uses a modified version of DPCM coding for quaternions (see FIGS. 7 and 8 below). FIG. 6 shows a feedback system 23 for performing DPCM coding in blocks 20, 21 and 22. The DPCM coding is substantially similar in all three blocks, with one difference being that the DPCM coding performed in blocks 21 and 22 is performed on vector values (scaling and displacement) and the DPCM coding performed in block 20 is performed on a scalar value (time).

Using time as an example, and referring to FIG. 6, the first and last time values of a frame are transmitted as uncompressed 32-bit floating point numbers, x[0], x[N−1], where "N" is the total number of frames. A calculated prior time value x^[n−1] (n≧1), obtained in feedback loop 25, is subtracted from a time value x[n] at summation block 26, and the resulting difference, d[n], is quantized in quantization block 27. Sign and magnitude values of the quantized difference, $d_q[n]$, are separately coded in entropy coding block 29 using an adaptive arithmetic compressor.

Feedback loop 25 is used to obtain the prior time value x^[n−1]. The quantized difference value, $d_q[n]$, is fed back to inverse quantization block 30 in feedback loop 25. Inverse quantization block 30 performs inverse quantization on quantized $d_q[n]$ to obtain the difference value d^[n], which is a calculated version of the original difference value d[n]. The value of d^[n] is added (in summation block 31) to the prior time value x^[n−1] to obtain the value x^[n], which is a calculation of x[n]. The value of x^[n] is delayed by delay block 32 to obtain x^[n−1], which is subtracted from x[n].

Blocks 21 and 22 perform a process that is similar to that performed for time in FIG. 6. Only the process for coding displacement is described; however, the process for coding scaling is identical to that for coding displacement (since both displacement and scaling are 3D vectors).

Displacement values are transmitted as uncompressed 32-bit floating point numbers to block 22. FIG. 6, which also shows the components of block 20, shows the components of block 22. In this case, the difference, d[n], between x[n] (the displacement vector in this case) and x^[n−1], is a 3D vector having three components. Each component (e.g., XYZ) of the difference vector, d[n], is quantized in quantization block 27. The magnitudes of the quantized difference vector components are entropy coded in entropy coding block 29 using an adaptive arithmetic compressor. The signs of the three difference vector components (e.g., XYZ) are collected into one symbol in entropy coding block 29, where they are coded separately using an adaptive arithmetic compressor.

Turning back to block 24 (FIG. 4), each component of a quaternion that defines bone orientation in a key frame may be coded using the feedback system of FIG. 6. That is, x[n] may be each of the quaternion components x, y and z. Since the quaternions are of unit-magnitude, the value for w can be obtained from the x, y and z values using equation (3) above. Accordingly, the w value of the quaternion can be obtained at a receiver (FIG. 9 below) and need not be coded in the transmitter (FIG. 4).

Figure 8:
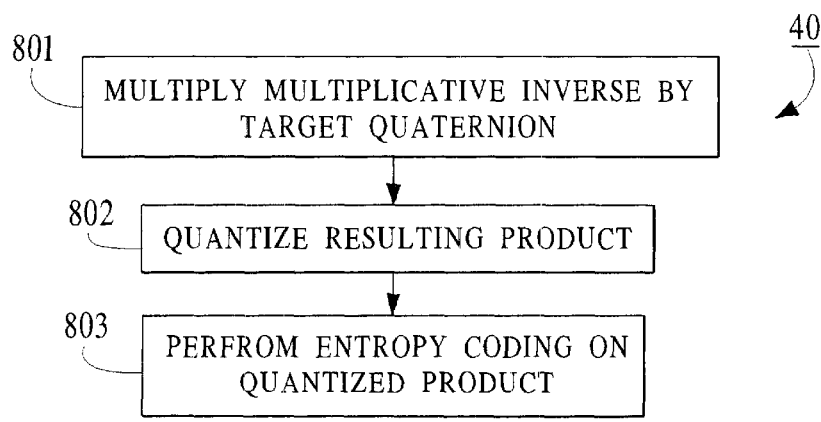
FIG. 8 is a flowchart showing a process that is performed by the system of FIG. 7.

Alternatively, block 24 may code the quaternion using the feedback system 35 of FIG. 7. Comparing FIG. 7 to FIG. 6, the difference in FIG. 7 is that the summation blocks of FIG. 6 are replaced by multiplication blocks 36 and 37. Also, an inverter 39, which obtains the multiplicative inverse of a unit-magnitude quaternion, is included and used as described below. FIG. 8 shows a process 40 for coding quaternions using feedback system 35.

Process 40 multiplies (801) a current quaternion, q[n], by the multiplicative inverse of a quaternion that preceded the target quaternion in time, $(q\hat{}[n-1])^{-1}$, and quantizes (802) the product, d[n], in quantization block 41. Quaternion quantization is performed in substantially the same way as vector quantization. That is, the signs of components x, y and z are collected into a single symbol and the magnitudes of components x, y and z are quantized. The quantized values 42 are then entropy coded in entropy coding block 44.

As above, a feedback loop 45 is used to obtain the prior quaternion, q^[n−1]. The quantized value of $d_q[n]$ is fed back to inverse quantization block 46 in feedback loop 45. Inverse quantization block 46 performs inverse quantization on that value to obtain the value d^[n], which is the calculated value of the original value d[n]. The value of d^[n] is multiplied (in multiplication block 36) by the prior quaternion x^[n−1] to obtain the value q^[n], which is the calculated value of q[n]. The value of q^[n] is delayed by delay block 47 to obtain q^[n−1], which is applied to inverter block 39 to obtain $(q\hat{}[n-1])^{-1}$. As noted, the multiplicative inverse of q^[n−1] is obtained by changing the signs of its x, y and z components.

Multiplying input quaternion q[n] and a prior unit-magnitude quaternion (in this case, $(q\hat{}[n-1])^{-1}$) produces another unit-magnitude quaternion, here d[n]. Operating on unit-magnitude quaternions requires less processing than operating on non-unit-magnitude quaternions. In this regard, the difference between two unit-magnitude quaternions is not necessarily a unit-magnitude quaternion. Thus, feedback system 35 (which multiplies quaternions) has advantages over feedback system 23 (which takes quaternion differences) when coding unit-magnitude quaternions. Moreover, multiplication results in a lower sensitivity to quantization noise, resulting in higher tolerance for quantization noise and relatively better compression by entropy coding block 44.

Referring back to FIGS. 4 and 5, in process 16, multiplexer 50 multiplexes (504) the coded output of blocks 20, 21, 22 and 24 (the time, scaling, displacement and orientation, respectively). The output 51 of multiplexer 50 is transmitted (505) over a communications channel. The communications channel may be a network, such as the Internet, any electrical connection between two computers, an internal computer bus, a wireless link, or any other medium over which data is transmitted.

Figure 9:
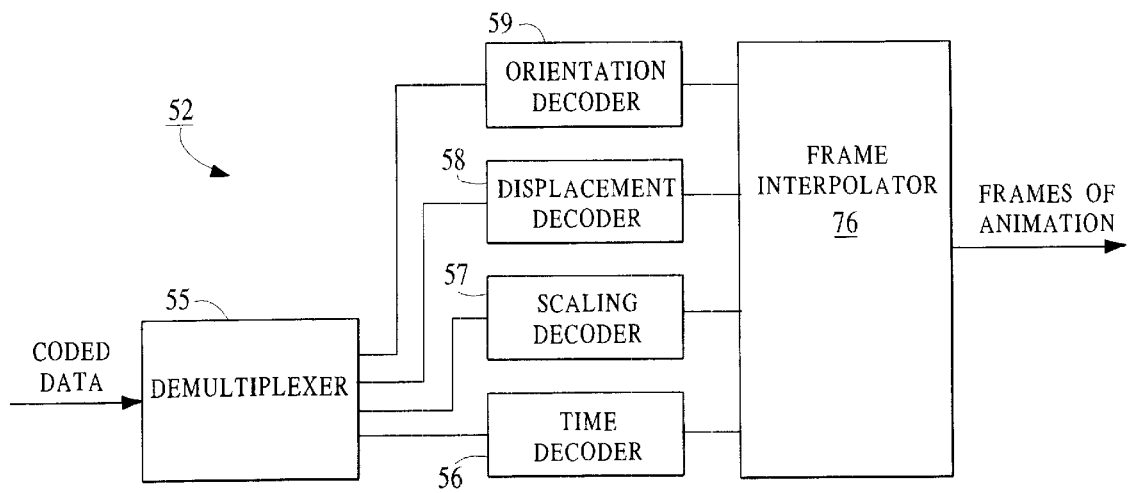
FIG. 9 is block diagram of a system for decoding coded 3D data relating to the bones in the 3D model.
Figure 10:
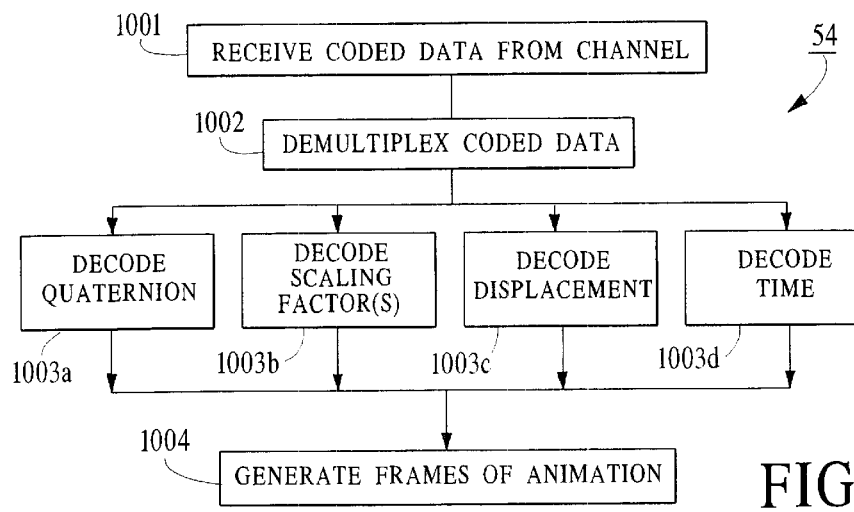
FIG. 10 is a flowchart showing a process that is performed by the system of FIG. 9.

FIG. 9 shows a block diagram of a receiver 52, which receives 3D animation data that has been coded using block diagram 15. FIG. 10 shows a process 54 performed by the receiver to decode the coded data. In process 54, demultiplexer 55 receives (1001), over a communications channel, the multiplexed coded data from multiplexer 50. Demultiplexer 55 separates the coded data bitstreams, resulting in separate streams of coded orientation data, coded displacement data, coded scaling data, and coded time data. Each of these coded bitstreams is applied to a corresponding decoding block 56, 57, 58 and 59 where the respective bitstream is decoded.

Figure 11:
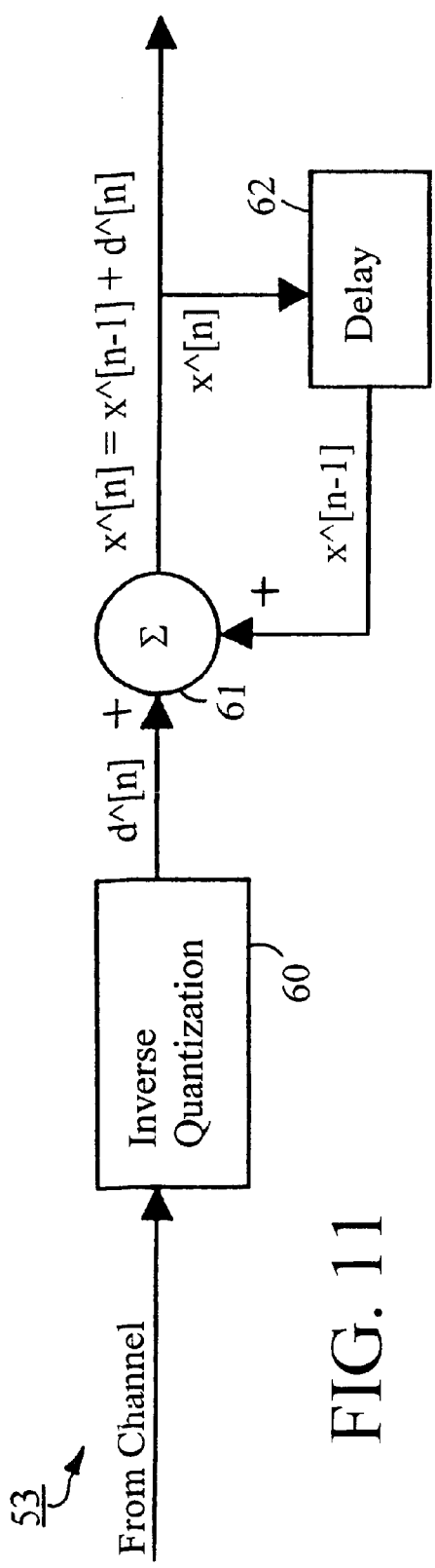
FIG. 11 is a block diagram of a DPCM system for decoding coded data that relates to the bones in the 3D model.

The feedback system 53 used in time decoding block 56, scaling decoding block 57, and displacement decoding block 58 is shown in FIG. 11. The decoding process performed by each of these blocks is identical, except that the displacement decoding block 58 and scaling decoding block 57 decode vector values and time decoding block 56 decodes a scalar.

Referring to FIG. 11, and taking the coded time data as an example, inverse quantization block 60 receives the coded time data stream from demultiplexer 55 (FIG. 9). Inverse quantization block 60 dequantizes the coded time data and performs any necessary entropy decoding in order to obtain dequantized data, d^[n]. Dequantized data, d^[n], is then added, using summation block 61, to a previous decoded value, x^[n−1], to obtain the decoded time value, X^[n]. This value corresponds to the x[n] value input in FIG. 6. The previous value x^[n−1] is obtained by delaying x^[n] in delay block 62.

Figure 12:
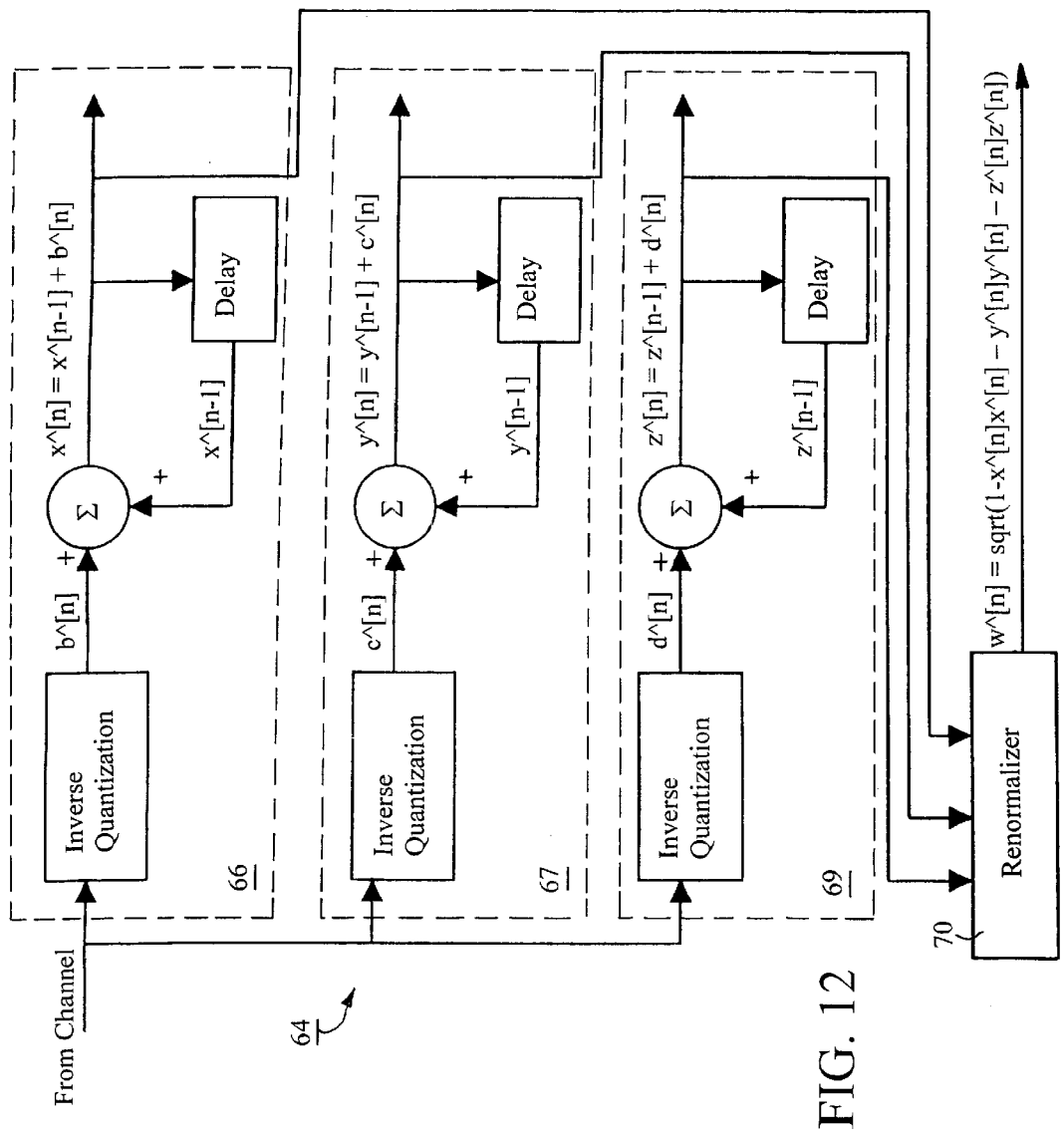
FIG. 12 is a block diagram of a system for decoding quaternions that were coded using the DPCM system of FIG. 6.

Referring back to FIG. 9, how quaternion (orientation) decoding block 59 is implemented depends on how quaternion coding block 24 (FIG. 4) was implemented. If quaternion coding block 24 codes the x, y and z quaternion components using the feedback system of FIG. 6, the feedback system 64 of FIG. 12 is used to implement quaternion decoding block 59. Feedback system 64 includes three parallel systems 66, 67 and 68, each of which is identical to system 53 (FIG. 11). System 66 decodes the x component of the quaternion; system 67 decodes the y component of the quaternion; and system 69 decodes the z component of the quaternion. The decoded x^[n], y^[n] and z^[n] components are provided to a renormalizer block 70. Renormalizer block 70 obtains the decoded w^[n] component from the x^[n], y^[n] and z^[n] components by $$w^\wedge[n] = \text{SQRT}\{1 - x^\wedge$$

$$[n]x^\cdot[n] - y^\wedge$$

$$[n]y^\cdot[n]$$

$$-z^\cdot[n]z^\cdot[n]\}. \quad (4)$$

The w^[n], x^[n], y^[n] and z^[n] values are combined per equation (1) above, to obtain the quaternion q^[n].

Figure 13:
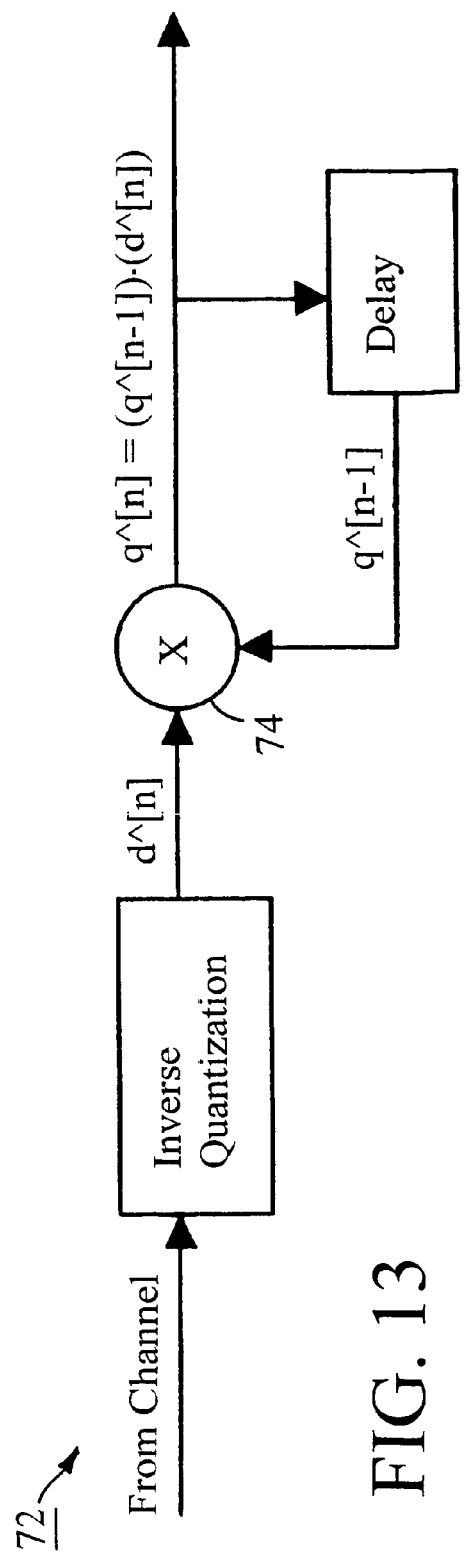
FIG. 13 is a block diagram of an alternative system for decoding quaternions that were coded using the modified DPCM system of FIG. 7.

If the feedback system of FIG. 7 is used to code the quaternion, the feedback system of FIG. 13 is used to perform the decoding in block 59 (FIG. 9). The feedback system 72 of FIG. 13 is similar to that shown in FIG. 11, except that the summation blocks of system 53 are replaced by multiplication block 74 and the output q^[n] is a quaternion. Otherwise, system 72 is the same as system 53.

Referring back to FIG. 9, the decoded outputs of blocks 56, 57, 58 and 59 are provided to frame interpolator 76. Frame interpolator 76 combines the bitstreams and provides missing frames to the resulting animation. Referring to FIG. 10, the missing frames may be generated (1004), e.g., based on information in the decoded bitstreams or to achieve a particular animation resolution. Known interpolation techniques are used to interpolate the missing frames from the existing frames.

Figure 14:
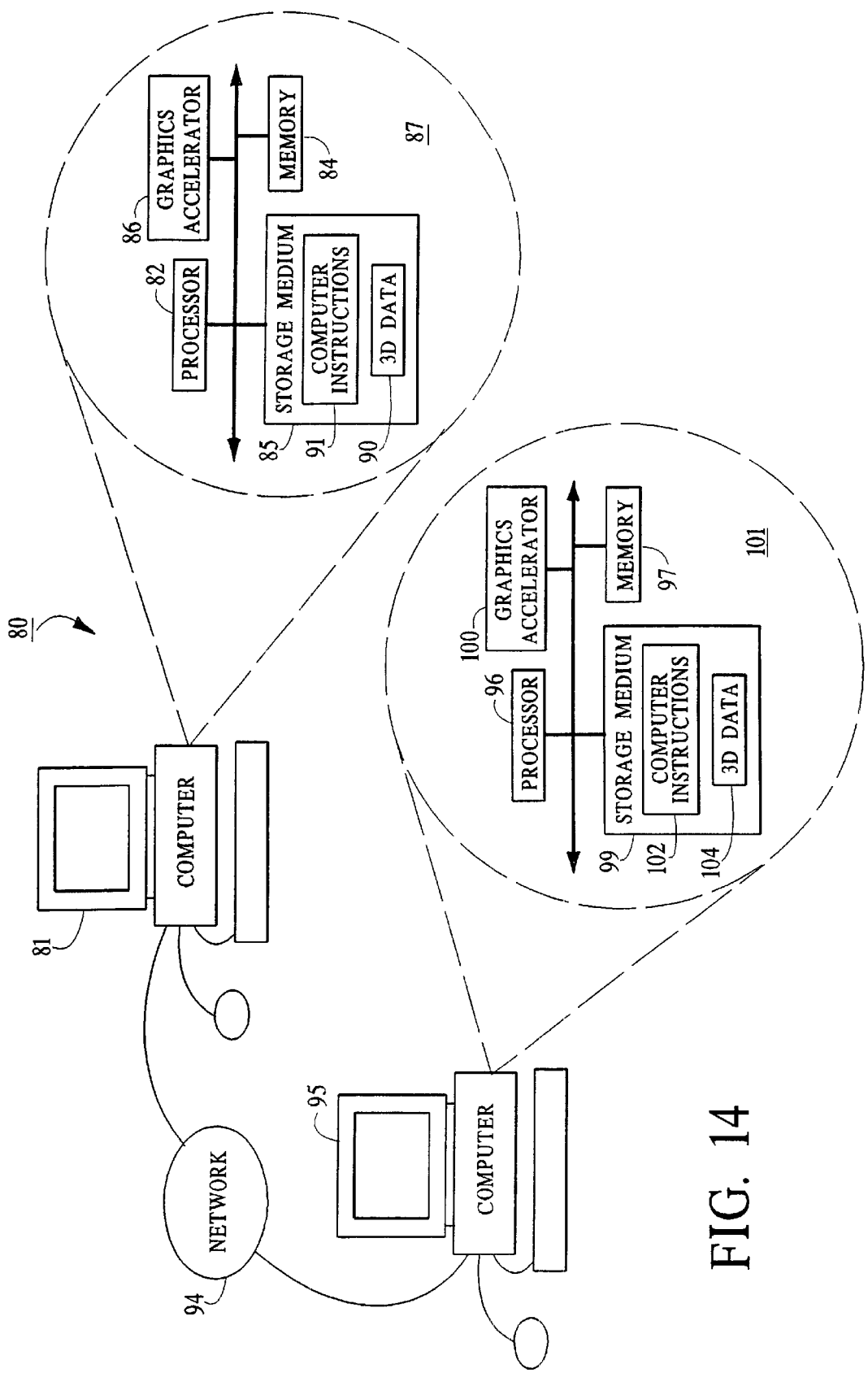
FIG. 14 is a block diagram of a computer network on which the coding and decoding systems may be implemented.

FIG. 14 shows an example of a computer system 80 for coding and decoding 3D animation using the above processes. Computer 81 (the coder/transmitter) includes a processor 82, a memory 84, a storage medium 85 (e.g., a hard disk), and a 3D graphics accelerator 86 for processing 3D data and generating 3D animation (see view 87). Storage medium 85 stores 3D data 90 for a 3D model, and instructions 91 which are executed by processor 82 out of memory 84 to perform processes 16 and 40 on frames of 3D data.

Computer 81 is connected to network 94 via a wired or wireless connection. Computer 81 transmits coded 3D data over network 94 to computer 95, which is also connected to network 94. Computer 95 (the decoder/receiver) includes a processor 96, a memory 97, a storage medium 99 (e.g., a hard disk), and a 3D graphics accelerator 100 for processing 3D data and generating 3D animation (see view 101). Storage medium 99 stores 3D data 102 (frames) for the animation and instructions 104, which are executed by processor 96 out of memory 97 to perform process 54 for decoding the coded data.

Although personal computers and a network are shown in FIG. 14, processes 16, 40 and 54 are not limited to use with the hardware and software of FIG. 14. They may find applicability in any computing or processing environment. Processes 16, 40 and 54 may be implemented in hardware, software, or a combination of the two. Processes 16, 40 and 54 may be implemented in computer programs executing on programmable computers or other machines that each include a processor, a storage medium readable by the processor (including volatile and non-volatile memory and/or storage components), at least one input device, and one or more output devices. Program code may be applied to data entered using an input device (e.g., a mouse or keyboard) to perform processes 16, 40 and 54 and to generate output information.

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform processes 16, 40 and 54. Processes 16, 40 and 54 may also be implemented as a computer-readable storage medium, configured with a computer program, where, upon execution, instructions in the computer program cause the computer to operate in accordance with processes 16, 40 and 54.

Other embodiments not described herein are also within the scope of the following claims. For example, processes 16, 40 and 54 are not limited to use with bone-based 3D animation. They may be applied in any DPCM context to code any type of data for transmission over a medium. Likewise, although coding and decoding were described with respect to unit-magnitude quaternions, non-unit-magnitude quaternions may also be used with the processes described herein.

What is claimed is:

1. A method of coding three-dimensional data that defines a bone in a three-dimensional model, comprising:
   coding a quaternion defining an orientation of the bone, wherein coding the quaternion comprises:
     obtaining a multiplicative inverse of a prior quaternion that preceded the quaternion in time;
     multiplying the multiplicative inverse by the quaternion to obtain a product;
     quantizing the product to obtain a quantized value; and
     performing entropy coding on the quantized value;
   coding vectors defining a displacement of the bone and a scaling factor for the bone; and
   coding a value defining a time corresponding to the orientation, displacement and scaling of the bone.

2. An article comprising:
   a medium that stores instructions for coding three-dimensional data that defines a bone in a three-dimensional model, the instructions causing a machine to:
     code a quaternion defining an orientation of the bone, wherein coding the quaternion comprises:
       obtaining a multiplicative inverse of a prior quaternion that preceded the quaternion in time;
       multiplying the multiplicative inverse by the quaternion to obtain a product;
       quantizing the product to obtain a quantized value; and
       performing entropy coding on the quantized value;
     code vectors defining a displacement of the bone and a scaling factor for the bone; and
     code a value defining a time corresponding to the orientation, displacement and scaling of the bone.

3. An article comprising:
   a medium that stores instructions for coding a target quaternion, the instructions causing a machine to:

obtain a multiplicative inverse of a prior quaternion that preceded the target quaternion in time;

multiply the multiplicative inverse by the target quaternion to obtain a product;

quantize the product to obtain a quantized value; and perform entropy coding on the quantized value.

4. The article of claim 3, further comprising instructions that cause the machine to obtain the prior quaternion from the quantized value.

5. The article of claim 3, further comprising instructions that cause the machine to obtain the prior quaternion by:

performing an inverse quantization on the quantized value to obtain the product; and providing the quantized value to a feedback loop which determines the prior quaternion.

6. An apparatus for coding three-dimensional data that defines a bone in a three-dimensional model, comprising:

a memory that stores executable instructions; and a processor that executes the instructions to:

code a quaternion defining an orientation of the bone, wherein coding the quaternion comprises:

obtaining a multiplicative inverse of a prior quaternion that preceded the quaternion in time;

multiplying the multiplicative inverse by the quaternion to obtain a product;

quantizing the product to obtain a quantized value; and performing entropy coding on the quantized value;

code vectors defining a displacement of the bone and a scaling factor for the bone; and code a value defining a time corresponding to the orientation, displacement and scaling of the bone.

7. An apparatus for coding a target quaternion, comprising:

a memory that stores executable instructions; and a processor that executes the instructions to:

obtain a multiplicative inverse of a prior quaternion that preceded the target quaternion in time;

multiply the multiplicative inverse by the target quaternion to obtain a product;

quantize the product to obtain a quantized value; and perform entropy coding on the quantized value.

8. The apparatus of claim 7, wherein the processor executes instructions to obtain the prior quaternion from the quantized value.

9. The apparatus of claim 7, wherein the processor executes instructions to obtain the prior quaternion by:

performing an inverse quantization on the quantized value to obtain the product; and providing the quantized value to a feedback loop which determines the prior quaternion.

* * * * *